US012601811B1

(12) United States Patent
Judd

(10) Patent No.: US 12,601,811 B1
(45) Date of Patent: Apr. 14, 2026

(54) BORESIGHT METHOD WITH AN EXTERNAL EXTENDED ARRAY

(71) Applicant: Mano Judd, Heath, TX (US)

(72) Inventor: Mano Judd, Heath, TX (US)

( * ) Notice: Subject to any disclaimer, the term of this patent is extended or adjusted under 35 U.S.C. 154(b) by 71 days.

(21) Appl. No.: 18/653,325

(22) Filed: May 2, 2024

(51) Int. Cl.
| | |
|---|---|
| *G01S 7/40* | (2006.01) |
| *G01S 7/03* | (2006.01) |
| *H01Q 3/26* | (2006.01) |

(52) U.S. Cl.
CPC ............ *G01S 7/4026* (2013.01); *G01S 7/032* (2013.01); *H01Q 3/2676* (2013.01)

(58) Field of Classification Search
CPC ...... G01S 7/4026; G01S 7/032; H01Q 3/2676
See application file for complete search history.

(56) References Cited

U.S. PATENT DOCUMENTS

| | | | |
|---|---|---|---|
| 10,185,022 B1* | 1/2019 | Judd | G01S 3/023 |
| 2020/0076517 A1* | 3/2020 | Zhu | H04B 17/14 |

* cited by examiner

*Primary Examiner* — Robert W Hodge
*Assistant Examiner* — Bongani Jabulani Mashele

(57) ABSTRACT

The present invention, Boresight Method with External Extended Array, is a novel way of incorporating the Boresight Mechanism into an external extended antenna array, displaced from the receiver and processing components by more than a few feet, and assuring high bearing angle accuracy, for Directional of Arrival (DoA) applications, such as Direction Finding or Radar, during RF signal collection by delivering a continuously injected calibration signal (also called a reference signal) ahead of all or most active components, to correct for phase and amplitude errors or signal perturbations.

9 Claims, 16 Drawing Sheets

Fig. 3

<u>Traditional Method</u>

• RF Synthesizer path produces the boresighting signal

Fig. 4          PRIOR ART

Note:  Numerical Label Indexing is different from the current document

BORESIGHT METHOD WITH AN EXTERNAL EXTENDED ARRAY

The present application claims priority to the earlier filed provisional application having Ser. No. 63/464,419, and hereby incorporates subject matter of the provisional application in its entirety.

TECHNICAL FIELD

The present invention is in the technical field of Antennas, Antenna Arrays, RF receivers, Direction Finding or Radar Methodologies and/or RF Calibration and Boresighting. More specifically, the present invention is a novel way of incorporating the Boresight Mechanism into an external antenna array, displaced from the receiver and processing components by more than a few feet, and assuring high bearing angle accuracy, for Directional of Arrival (DoA) applications, such as Direction Finding or Radar, during RF signal collection by delivering a continuously injected calibration signal (also called a reference signal) ahead of all or most active components, to correct for phase and amplitude errors or signal perturbations.

BACKGROUND OF THE INVENTION

During the signal collection process used in Direction Finding (DF), Digital Radar or other Spatial Processing applications, signals are collected by an array of antennas, where the signal is transport via transmission lines to a centralized system by RF cable or fiber optic lines and processed by multichannel receivers. These receivers take the collected signals and coherently shift them down in frequency to an Intermediate Frequency (IF) or to baseband, so that they can be digitized via high speed Analog to Digital Converters, and subsequently processed by Digital Signal Processors.

In some systems, the antennas are close to the centralized receiver system. In these systems, the antenna array is in a location relatively co-located with the digitizer and often the signal processor(s), with most of the antennas a half wavelength to a few wavelengths separated from one another. In this case all of the antennas are relatively close to the centralized receiver system. That is, a relative short cabling distance away from the receiver where the RF losses in the RF cables can be considered negligible and does not significantly reduce the system Signal to Noise Ratio (SNR).

However, in most systems, the centralized receiver, digitizer, and processing system is far located from the various antennas in the array. Additionally, in some cases the antenna array can be distributed such that antennas in the array are far from one another, in terms if wavelength distances. In these instances, the larger RF losses due to long RF cabling can significantly reduce the SNR of the systems.

Historically, for most Bearing Angle estimation processes, such as Direction Finding or Radar, the Angle of Arrival (AoA) accuracy is often compromised when using most multi-channel receivers since the frequency shift operation results in phase and/or amplitude distortions of each signal, that add to perturb the true cross product of the antennas, and therefore perturb the effective cross phase. This distortion is often caused by temperature, time, and vibration instability of the various RF and IF components in the receivers, as well as any and all multiplicative processes which include high frequency signal mixing. All of these events can therefore add either multiplicative products, such as colored noise, phase noise, or other non-linear components into the cross phase outputs. To attempt to correct these distortions, conventional DF used often use switched calibration (or boresighting) to attempt to attempt to compensate for these non-stationary, time invariant effects. This process involves occasionally injecting a calibration (or boresight) signal into the path between the antennas and the multichannel receiver. However, this method has serious shortcomings. In the switched method, the antennas are momentarily switched out, when the calibration boresight source is switched in, usually only once per day or per flight, for airborne systems. It has been discovered that the time invariance of these detrimental effects occurs at a much faster rate and shorter time scales than simply once per day or per month. In fact, these non-linear time variant perturbations seem to occur, as discovered by rigorous lab and flight testing, on a millisecond or microsecond time scale. Thus, RF calibration corrections that only boresight once per day or even per hour, are insufficient to reduce these non-linear time variant errors, to produce bearing angle accuracies better than roughly 1 degree (spatial).

In U.S. Pat. No. 10,185,022, a continuous correction system has been devised to fully correct for these errors, with novel circuitry that becomes an intimate part of the whole system. However, U.S. Pat. No. 10,185,022 does not specifically address the RF cabling loss issue(s) nor means to compensate for lengthy and lossy cables, as well as bulky/heavy thicker cables with lower loss. This invention specifies numerous solutions to these cabling issues as well as presents compact and relative low-cost solutions to the array packaging problem and transmission line delivery system to conserve the system SNR.

BRIEF SUMMARY OF THE INVENTION

The present invention is a Method for RF Boresighting.

The present invention is a collection of various methods for applying the methods of U.S. Pat. No. 10,185,022 to antennas and arrays that are significantly displaced from the multi-channel receiver and digitizer system, by more than roughly 10 feet in distance.

The methods in U.S. Pat. No. 10,185,022 correct for signal and noise errors which occur in a receiver during signal collection due to changes in temperature, a receiver's age, vibration of the system during collection, oscillator lock, and non-linear multiplication of signals, such as the signal mixing or RF down conversion process. However, U.S. Pat. No. 10,185,022 does not address the complexity or difficulties associated with significantly separating the antennas and RF couplers from the multi-channel receiver and digitizer system, or presents a method to conserve signal SNR. For example, the use of long RF cables can produce significant RF losses in the system which translate to higher Noise Figure and lower Signal to Noise Ratio (SNR) in the resulting digitized data. Additionally, for airborne platforms, which are size, weight, and power (SWAP) limited, use of heavy lower loss RF cables are undesired due to their increased diameter, weight, bulk, and inability to turn tight corners. Thus, net lower loss systems are desired, with either Low Noise Amplifiers, or Fiber Optic Cables.

The current invention expands on the initial Patent, first presented in U.S. Pat. No. 10,185,022, to include use of pre-amplification before the long cables, Fiber Optic transmission lines, multiple fiber optic lines, other modes or architectures, in which a coupled RF boresighting signal or collection of boresight signals, can be implemented, to achieve narrowband boresighting, pulse signal boresighting, or extremely wideband signal RF boresighting which corrects the signal distortion present in downstream active circuit components, and enables extremely high precision AoA measurements.

BRIEF DESCRIPTION OF THE DRAWINGS

For a more complete understanding of the present invention, reference is now made to the following descriptions taken in conjunction with the accompanying drawings, in which:

FIG. 3 illustrates the Conventional Boresighting Method using RF Switches.

DETAILED DESCRIPTION OF THE INVENTION

Conventional Array Response Model

Figure 1:
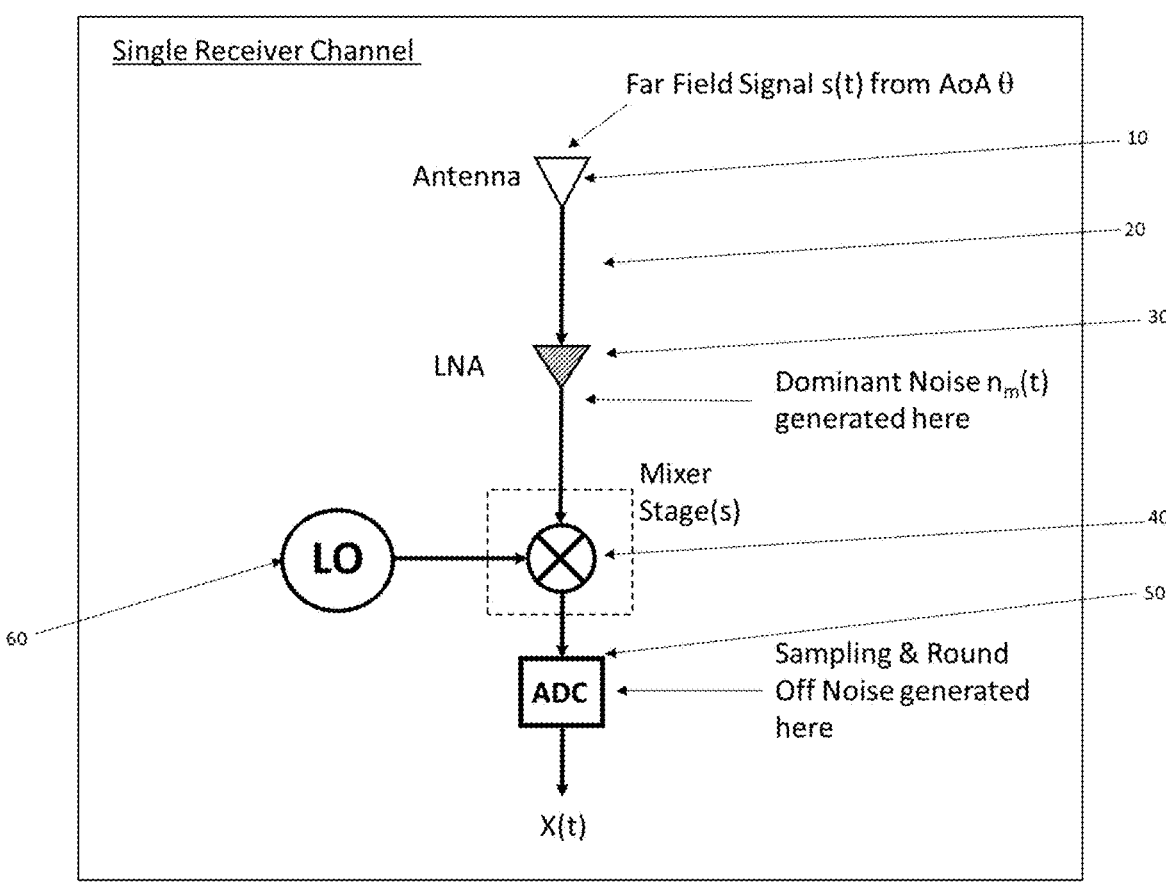
FIG. 1 shows the standard representation for the output of a single RF receiver system.

In an RF sensor, a receive sensor converts the received wavefield into an electrical signal. For the case of RF, the incident wavefield is comprised of photons. For Acoustics, the wavefield will either be air, water, or some other gas or liquid (molecules). In FIG. 1, the Applicant shows a conventional single channel (single antenna) receive system comprised of an antenna (10), a transmission line such as a coaxial cable (20), a Low Noise Amplifier (30), an RF Mixer (circuit) to downconvert or frequency shift the carrier signal to an Intermediate frequency (IF) or to baseband (40), and finally an Analog to Digital Converter (50).

The standard representation for the output of a single (RF or Acoustic) receiver system, which is shown in FIG. 1, is:

$$x(t) = s(t) + n(t)$$

where:

$x(t) =$ time variant output signal $s(t) =$ time variant input signal $n(t) =$ time variant additive noise Note at this stage, we are not specifying any particular signal type, signal bandwidth, or noise type or distribution.

In a Multi-Channel Receiver (MCR) system, following an antenna array system, we would denote an output vector for the collection of synchronized signals as:

$$\underline{x}(t) = \underline{a}(\theta)s(t) + \underline{n}(t)$$

where $x(t) =$ time variant output signal vector for $m = 1, 2, \ldots, MRF$ Channels $a(\theta) =$ array steering vector, for $M$ channels (dimension $M \times 1$)

$s(t) =$ time variant input signal, which is assumed exactly the same for each channel n(t)=time variant additive noise vector (dimension M×1)

The array steering vector includes both the time-path length from each antenna to the Far Field (desired) source signal, but also included all $m_{th}$ path unique lengths through the various transistor and mixer circuits within the receiver.

Figure 2:
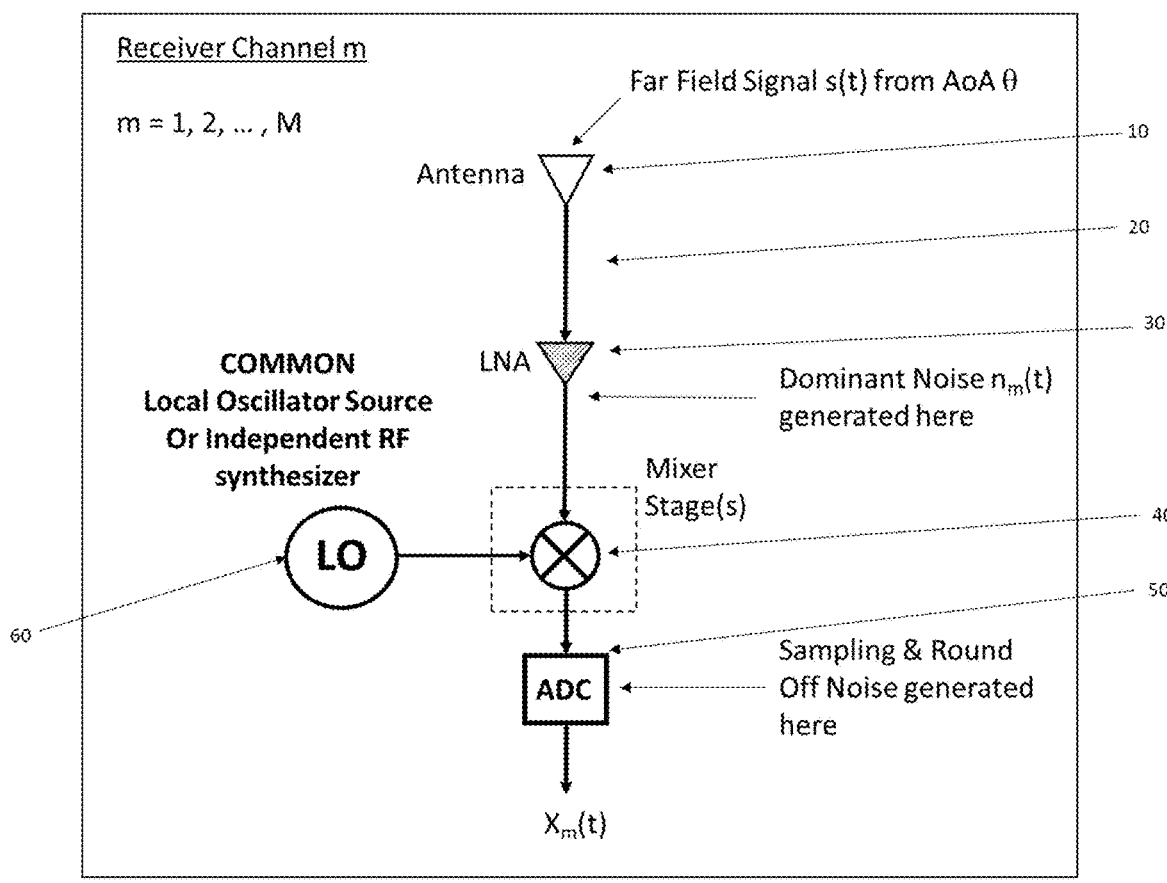
FIG. 2 displays the RF Schematic for a single channel of a Multi-Channel Receiver.

This is the traditional representation for the array signal output, from a conventional MCR. A single receiver channel is shown in FIG. 2. Notice that all components are similar to the Single Channel system of FIG. 1, except for the [Common] Local Oscillator (LO) Source (60). In more current receivers, this LO source can be an independent RF Synthesizer, which is time synchronized and phase locked to the other M-1 RF Synthesizers for the other channels (m=1, 2, . . . , M).

It should be noted that both the Analog channels as well as the Analog-to-Digital Converter (ADC) units are all also synchronized in time and coherent. At this point, we are not denoting which type of synchronization/coherency method is used, such as a Split-LO system or a system of individual synthesizers at each channel. That is, in general, the method will operate with any means to supply an antenna channel with a common RF signal used as a boresighting source.

Conventional Wisdom, including many thousands of published papers, suggests the following:

1. The dominant system noise in the system, for a receiver noise limited system (e.g. above roughly 100 MHz), is produced at the 1st stage LNA,
2. This noise is purely Gaussian Wide Sense Stationary.
3. All other noise contributions are small (in magnitude) compared to this (LNA generated) noise, including round-off noise (error).
4. The receiver transfer function itself is Wide Sense Stationary.

For the defined array response vector, $x_m(t)$, shown above, the narrowband AutoCorrelation function for an equal spaced linear array, $R_{xx}(\tau)$, can be defined as:

$$R_{xx}(\tau) = E[\underline{x}(t)x * (t)]$$

Where E is the Expectation operator, * is the complex conjugate, and $$\tau = \frac{d\sin(\theta)}{c}$$

Is the delay (lag) value for each non-diagonal component of $R_{xx}(\tau)$.

And $d$ = inter element spacing, for the equal spaced linear array $c$ = speed of light $\theta$ = Angle of Arrival ($AoA$) of the incident Far Field signal The Sampled Autocorrelation can then be defined, for a collection of N samples of the array response vector, $\underline{x}(t)$, as:

$$R_{xx}(\tau) \approx \frac{1}{N}\sum_{n=1}^{N}\underline{x}(n)\underline{x} * (n)$$

The Autocorrelation function thus defined so far is only a function of the inter-element spacing, frequency of the incident signal, and the Angle of Arrival. Note that a random process X(t) is said to be wide Sense Stationary (WSS) if its mean and autocorrelation function are time invariant. For a fixed location (and orientation) system and a fixed location external (Far Field or Near Field) source, the Array Response Autocorrelation function is assumed and expected to be time invariant, and would then be considered Wide Sense Stationary. That is, if one measured the Autocorrelation function in the month of January, and did not move and/or reposition the receive array nor the external (Far Field or Near Field) source, one would then expect to measure the exact same Autocorrelation function in June. By this definition, it should then be obvious that the Autocorrelation function for a receiver system would be time invariant, and thus WSS. It should be noted that this assumption is the basis for most all array processing-based research papers, as well as actual performance estimates for nearly all Direction Finding as well as Radar systems through-out history. For the remainder of this document, we will denote the external source as the "Far Field" source, and omit the wording of "Near Field", however, it should be obvious to one skilled in the art that the following methods would apply to both Far Field as well as Near Field external RF sources.

Thus the pursuit for improved bearing angle accuracy has always been to find methods that are outside of the box of the array receiving system, including:

1. Larger array size (dimensions) and/or greater number of receiver channels.
2. Improved spatial processing algorithms, such as MUSIC, MVDR, etc.

In general, the pursuit of ever better DF/Bearing Angle accuracies has been mostly limited to attempts to increase the size of the array baseline (distance between the outermost antennas), or to utilize ever better algorithms and software. In fact, it is highly believed by most experts in the field that the solution to better performance is algorithm centric; and never "system" centric. However, in the 1990's, it was found that although algorithms like MUSIC had numerous performance advantages, especially in the ability to handle numerous Co-Channel signals, that most algorithms actually had very similar bearing angle performance; at least to a single (non-co-channel) Far Field signal. In fact, MUSIC and MVDR have been compared via multiple technical research studies and papers and found to have very similar bearing angle performance, as a function of similar array size and Signal to Noise Ratio (SNR) values. Thus, for many years, prior to 2010, it was believed by most experts in the field that the only means to achieve better bearing angle was to utilize a larger baseline array. Additionally, no real effort has ever been recorded to verify the amount of stationarity (time invariance) of most receivers. This was until the Applicant's discovery in late 2010.

Conventional System Calibration for Higher Performance Systems:

Historical belief has been that the Receiver Autocorrelation Function (RAF) is mostly WSS; e.g. over long periods of time. For many ground-based DF systems, it has been assumed that the system is WSS over months or years. And to no surprise, many of these systems only achieve bearing angle performance at best to 5° to 20° (spatial) accuracy (error).

Figure 3:
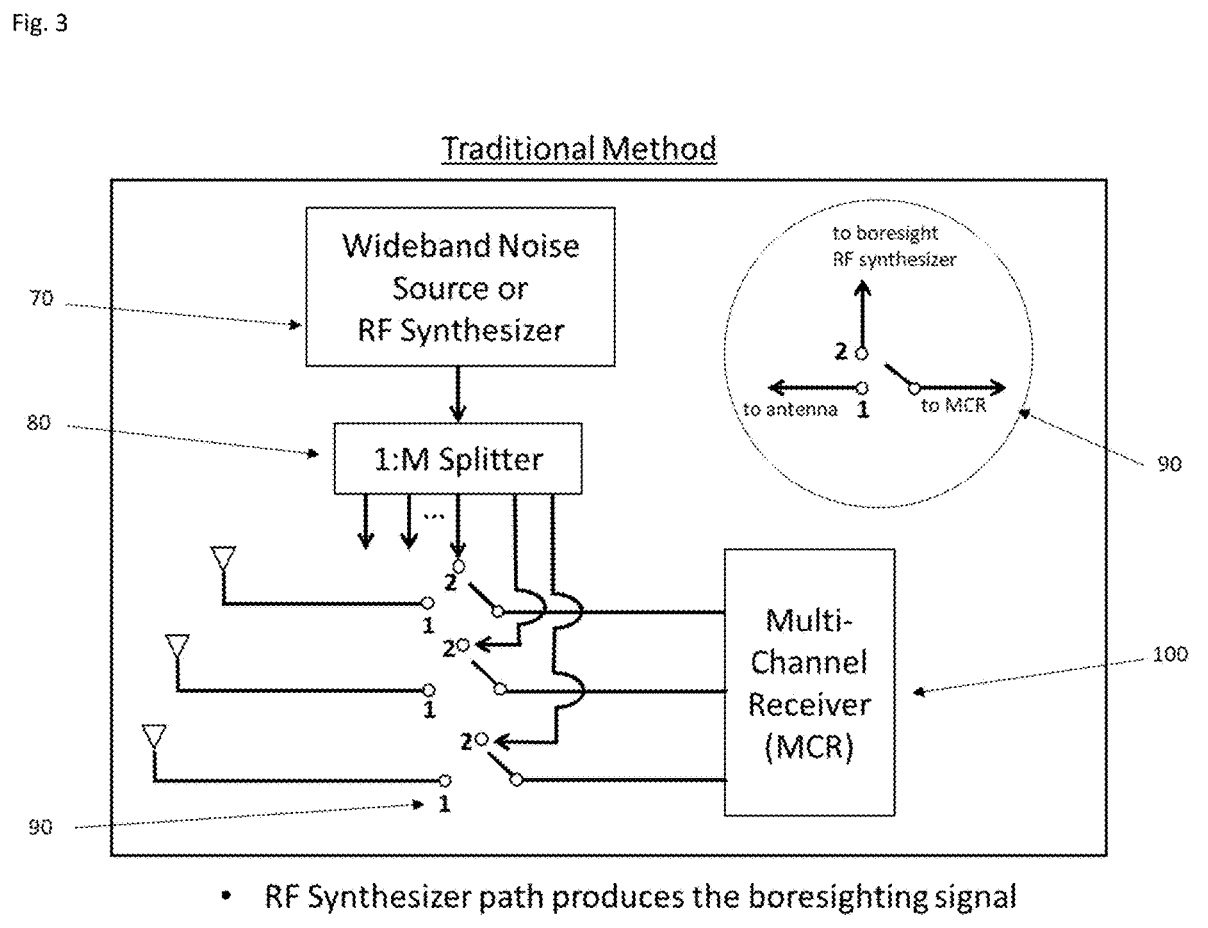

Designers of higher performance systems have typically assumed that extremes in temperature, via expanding cables and heated Receiver components could slightly alter the RAF, but that within day long or hour long time frames, the RAF was very WSS. These systems would perform an additional calibration correction, denoted as "RF Boresighting" once per day or once per flight, to attempt to correct the stored array manifold (e.g. calibration steering vectors, across azimuth and frequency, and sometimes elevation) for non-stationarity (e.g. time invariances) in long length cables, large temperature variations, or aging of components. This led to the use of Switched in Calibration techniques, as shown in FIG. 3. Single Pull Double Throw RF switches have typically been used.

For example, for higher precision airborne Direction Finding (DF) systems, this (switching to the boresight source, and generating a boresight data vector) was typically performed once a day, after the DF or Radar unit was turned on and warmed up, or for aircraft, right before or after take-off.

After the DF system was integrated on to the platform, the system was flown and steering vectors were produced for each stepwise increment in azimuth, frequency, and sometimes for elevation. For many years, most legacy ISR aircraft only produced Cal (an Array Manifold) in frequency and azimuth only, and not in elevation. In general, very few systems for airborne or ground use, spent the additional calibration or flight time and cost generating Cal in elevation.

In general, the Far Field Calibration Vectors were represented as:

$\underline{a}(\theta, \phi, f, t_{cal})$, denoted as "Steering Vectors"

Along with this far field calibration, the system would be "boresighted" using the internal source or RF synthesizer switched in to the MCR. This would be performed also at each frequency, and then the computer would generate an independent set of boresight calibration vectors:

$\underline{b}(f, t_{cal})$ for each and every array steering vector: $\underline{a}(\theta, \phi, f, t_{cal})$.

Note that the Far Field Calibration vectors are a function of the Azimuth Angle of Arrival, $\theta$, the Elevation Angle of Arrival, $\phi$, the specific carrier frequency, f, and of course the relative time that this calibration was taken, $t_{cal}$, while the boresight calibration vectors are a function of frequency only. For multi-polarization systems, the signal polarization component (vector) could also be included, however, these will not be addressed in this application. Note, for the switched method, the boresight source was set to the same frequency as the Far Field signal, and the boresight collection (dwell interval) was usually only microseconds or milliseconds away in time from the Far Field data collection dwell. Thus, for most practical purposes, the Far Field collection time interval $t_{cal}$ was "assumed" to be equivalent with the boresight data collection interval $t_{cal}$, when in actuality, these were actually at significant different times. That is, up to minutes or even hours apart. This will be discussed later.

Calibration data was often taken at step values of both the azimuth and elevation angles, as well as in frequency, depending on how much flight time was allotted to calibration data collection. That is, significant and expensive flight time has been associated with the collection of dense Cal data, especially when multiple elevation points are desired. However, for the most part, many systems only calibrate at a single elevation angle. Autocorrelation functions were usually airborne computed, stored, and then processed on the ground to generate the calibration tables (array steering vectors). Later, in operation, these vectors would be interpolated over both space and frequency, upon demand.

Again, for the airborne DF example, in operation, usually right after take-off, the system would (again) be boresighted. Just after take-off, the MCR system would often be boresighted, just once (at each frequency), to obtain a single bore vector for each frequency, of:

$\underline{b}(f, t_{opto})$

Where $t_{opto}$ is the time from of the operational-time just after take-off, or "opto".

Then during (operational) flight, when a signal was detected from the [SIGINT] signal intercept system and determined to be a signal of interest, the intercept system would hand off the frequency to the RF Geolocation System, to extract a bearing angle or Direction of Arrival (DoA). The set of Array Manifold vectors, $\underline{a}(\theta, \phi, f, t_{cal})$, would then be boresight corrected via the following transform:

$$a'_m(\theta, \phi, f, t_{cal}) = a_m(\theta, \phi, f, t_{cal}) \frac{b_m(f, t_{opto})}{b_m(f, t_{cal})} \text{ for } m = 1, 2, \dots, M$$

Where the prime represents the modified calibration vector.

There are a number of characteristics and limitations particular with this approach:

1. While the switches are in the boresight position (e.g. directed to the boresight source or synthesizer), Far Field signal data cannot be collected. Thus, one could not boresight at the same time as collection of a signal.

2. The time interval between the RF dwells for the boresighting process, and the operational collection of the data steering vectors, could be many hours in time separation.

3. For more highly sophisticated systems, where the boresighting was implemented in more real time, the boresight vector, b, and the Far Field signal data vector, $\underline{x}(t)$, can still only be measured at different times, although usually within an interval less than a few seconds.

4. Depending on the resolution of the boresight synthesizer, it was desired to choose the boresight frequency as close to the desired Far Field (intercepted) frequency.

5. Since many frequencies would be boresighted, and stored along with the calibration vectors and their boresight at time $t_{cal}$, it was assumed that the from the time of take-off and boresighting, $t_{opto}$, to the time of a Direction Finding (DF) measurement, that receiver system was still Wide Sense Stationary. That is, that the system was usually WSS for a time period of at least a full day or a full flight.

The success of this approach has been to achieve roughly 5° of DF system accuracy for low-cost system, or systems with array size on the order of 10 wavelengths or less. The very best airborne system could achieve DF accuracies, for most COMINT signals, on the order of 1°, at best. The belief was always that these systems were aperture limited. That is, the dominant error source in the DF estimate was due to limited aperture size of the array.

The actual architecture operation of a typical receiver is shown in FIG. 2, where the chain depicts a single channel (m) of a multi-channel receiver of M elements. This figure shows a single stage conversion, however, is general to include multi-stage downconverters as well (such as the Super-Het).

There are a number of non-linear processes that occur at the mixer stage of a receiver, since frequency shifting is in fact a trigonometric transform of sines and cosines (nonlinear functions). In fact, while phase noise and other artifacts are known to exist, there is actually very little published data on the measure, separation, and statistical effects of all the various components of "junk" (spurs, IMD, intermods, . . . ) produced within the mixer stage(s), in addition to ADC truncation noise. Additionally, to truly understand these processes, each would need to be separated from one another to measure and understand the Probability Distribution Function (PDF) of each independent process, and to determine the actual PDF function for each event and mechanism. In conventional Spatial Processing, these processes are simplistically treated as linear processes, and with effects that do not change or affect the PDF of the LNA generated noise, thus again estimating the output noise, $\underline{n}(t)$, as simply Gaussian WSS.

Through many measurements of the transfer function, the Applicant has determined that the output noise and thus the RAF are not truly WSS; at least to the accuracy level that would enable fantastic bearing angle errors. Furthermore, it is often assumed that any additive noise in the system, beyond the initial Low Noise Amplifier (LNA) KTB noise would both be well below the LNA noise, in amplitude, and further would also simply be additive and Gaussian.

Figure 4:
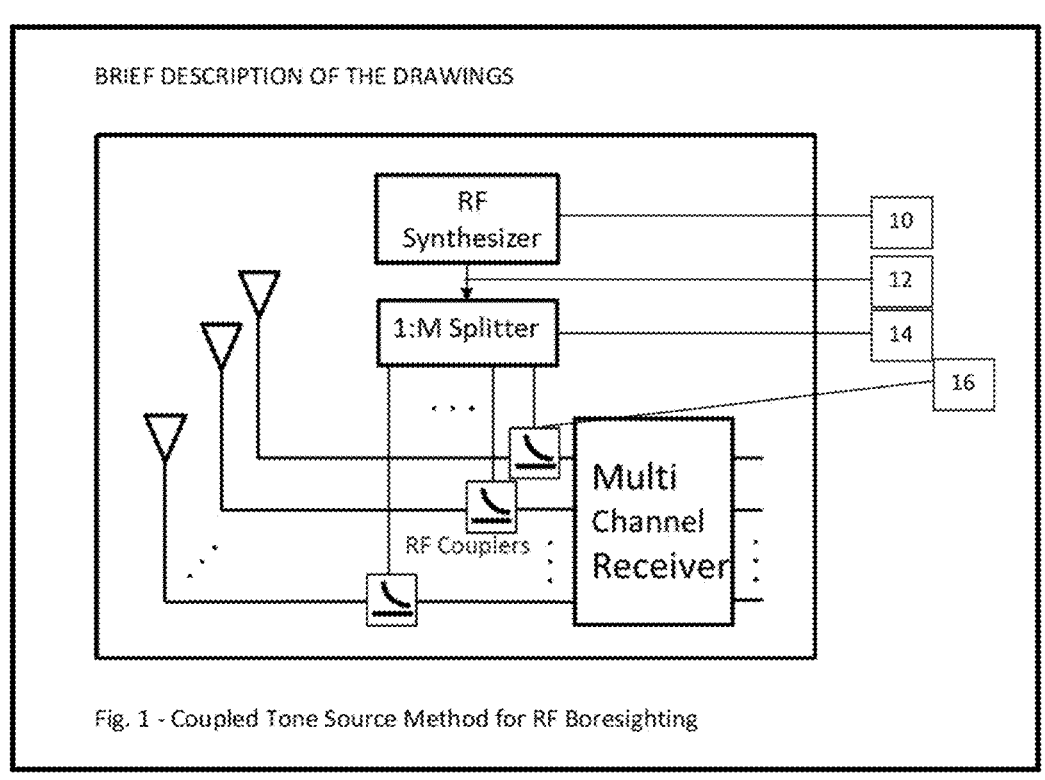
FIG. 4 shows the prior art for the coupled receiver boresighting system (U.S. Pat. No. 10,185,022). Note different Number/Label assignments.

In 2009, the Applicant and DRS (formerly Watkins Johnson Inc.) developed the Lancelot Receiver system. For reasons that the Applicant will not go into for this application, switching between the desired Far Field signal and the intermittent boresight signal, wasn't possible. Thus, the decision was made to use directional RF couplers, as opposed to SPDT RF switches, as shown in FIG. 4, which is prior art in patent Ser. No. 10/185,022.

Figure 5:
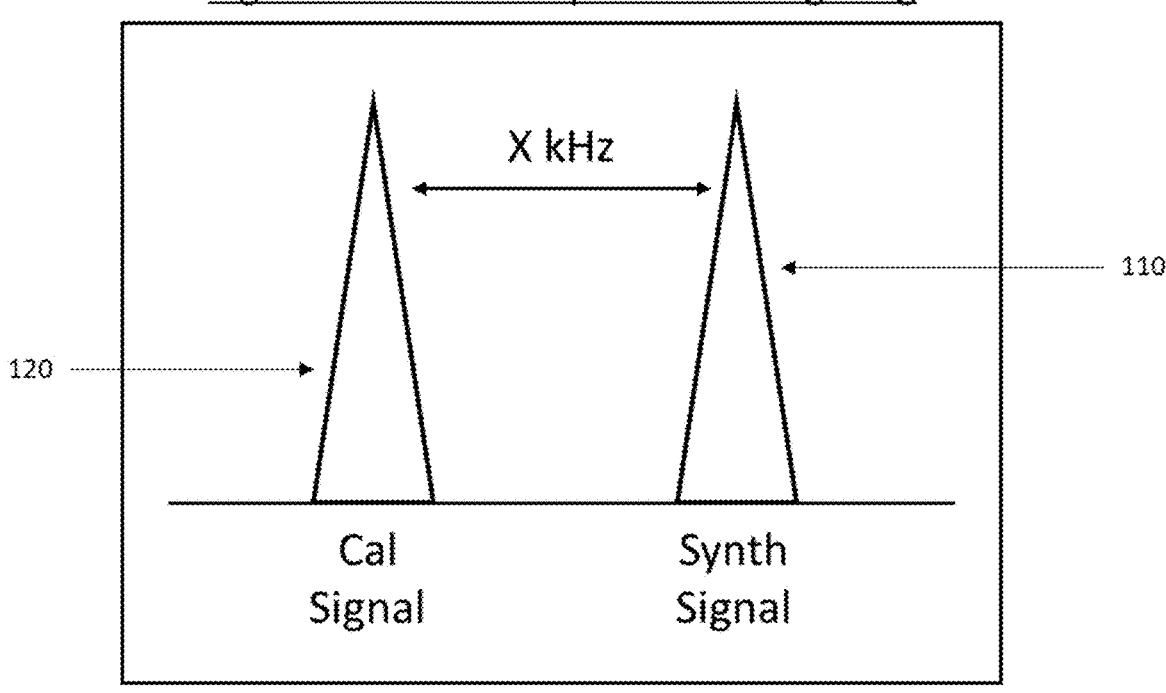
FIG. 5 illustrates the signal offset technique for boresighting.

At calibration, each RF ADC channel then output the following two signals: the synthesized boresight signal (110) and the desired Far Field Calibration Signal (120), as shown by the Spectral Diagram, in FIG. 5.

Figure 6:
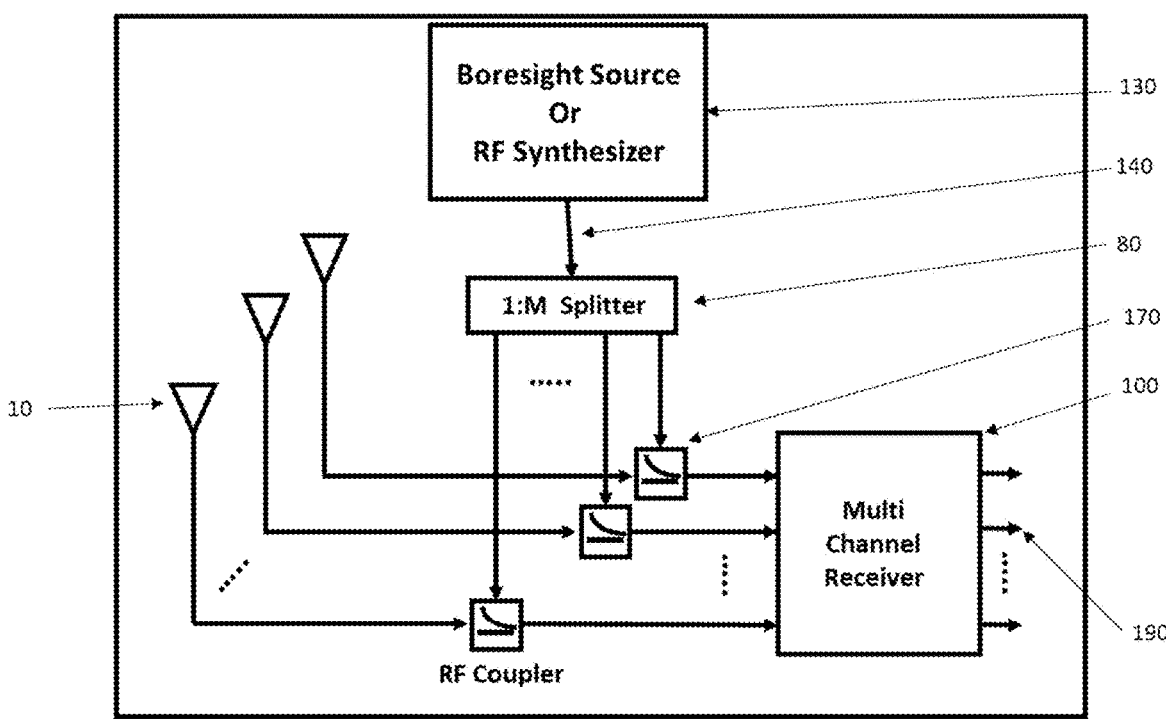
FIG. 6 and FIG. 7 show the Applicant's Original Boresight System from U.S. Pat. No. 10,185,022. New Number/Label assignments to match this document.

This system can be more specifically described by FIG. 6.

Outputs from each Multi-Channel receiver channel are labeled as (190). These outputs will be ADC digital outputs, however can also be simply analog RF or IF outputs as well.

This system now deviated from the Conventional Calibration and
boresighting process in that:
1. Directional Couplers as opposed to SPDT RF switches are used.
2. During system calibration, each Far Field calibration vector, $\underline{a}(\theta)$, can be collected at exactly the same time as the associated boresight vector, $\underline{b}$.
3. During operation, the Far Field data signal vector, $\underline{x}(t)$, can be collected at exactly the same time as the associated boresight vector, $\underline{b}$.
4. The boresight signal, for narrowband Far Field signals s(t), will not be on the exact same frequency. However, there are methods to place these two frequencies very close together.
5. Boresighting can be performed in real time, and not only after take-off.

In 2010, The Applicant flew this DF Collection system, in a program sponsored by the US Air Force, which used the above architecture. The result of this process produced extremely high quality calibration vectors, as well as very low error DF bearing angle estimates.

The Applicant has developed an augmented model for the output response of the Multi-Channel Receiver (MCR) system, following an antenna array system, as:

$$\underline{x}(t) = \mathrm{diag}\big[\underline{\gamma}(t)\big] \cdot [\underline{a}(\theta)s(t) + \underline{n}(t)] + \underline{\alpha}(t)$$

Where, again $\underline{x}(t)$ = time variant output signal vector for $m = 1, 1, \dots, MRF$ (Antenna)

$\underline{a}(\theta)$ = array steering vector, for $M$ channels (dimension $M \times 1$)

$s(t)$ = time variant input signal, which is assumed exactly the same for each channel $\underline{n}(t)$ = time variant additive noise vector (dimension $M \times 1$) and $\gamma(t)$ = the multiplicative noise component of receiver mixer effects $\alpha(t)$ = the additive noise component of the receiver mixer effects diag = diagonal matrix operator, with zeroes as non-diagonal components Note, that both $\gamma(t)$ as well as $\alpha(t)$ can include all the combined, interactive, and non-linear effects attributed to all components and paths of the receiver mixer, but can also include digital round-off effects within the ADC. Further, we treat both the amplitude, phase, as well as PDF values of both $\gamma(t)$ and $\alpha(t)$ as both unknown as well as time-variant. Finally, we place no knowledge on the amount of time variance or invariance within any time interval, or time of day. However, the Applicant has found through testing that time stationarity (invariance) improved with shorter and shorter time intervals.

This model actually makes good sense, since we know that phase noise is actually a multiplication of the input signal by a complex phase, or:

$$x'_m(t) = e^{\varphi(t)} \cdot [\underline{a}(\theta)s(t) + \underline{n}(t)]$$

Where $\varphi(t)$ is the random phase angle of the phase noise. A worst case assumption is that:

$$\gamma(t_i) \neq \gamma(t_{i+1})$$

for even very small time increments (on the order of microseconds).

Or that the value of the multiplicative noise component is time variant (e.g. different) from sample to sample. Rewriting this term:

$$\underline{x}(t) = \mathrm{diag}\big[\underline{\gamma}(t)\big] \cdot [\underline{a}(\theta)s(t) + \underline{n}(t)] + \underline{\alpha}(t)$$
$$= \mathrm{diag}\big[\underline{\gamma}(t)\big] \cdot \cdot \underline{a}(\theta)s(t) + \mathrm{diag}\big[\underline{\gamma}(t)\big] \cdot \underline{n}(t) + \underline{\alpha}(t)$$

This has profound issues with respect to signal integration and assumed processing gain.

One fundamental assumption in most processes that claim to achieve processing gain is that the noise is Gaussian WSS. With Gaussian WSS noise, the noise is assumed zero mean (by definition). However, analyzing the new noise mean would be:

$$\text{New mean} = E[\mathrm{diag}[\underline{\gamma}(t)] \cdot \underline{n}(t)]$$

The detailed statistical mathematics will be avoided here, however, it should be obvious that the multiplication of an assumed Gaussian Random variable with a component of unknown PDF and mean is unlikely (or at least not guaranteed) to be absolutely Gaussian. Especially since the artifacts of the Mixer circuit are not thermal noise based, but mostly non-linear multiplications.

Additionally, the additive $\alpha(t)$ term is assumed equally unknown, with unknown PDF, mean, and stationarity.

Figure 7:
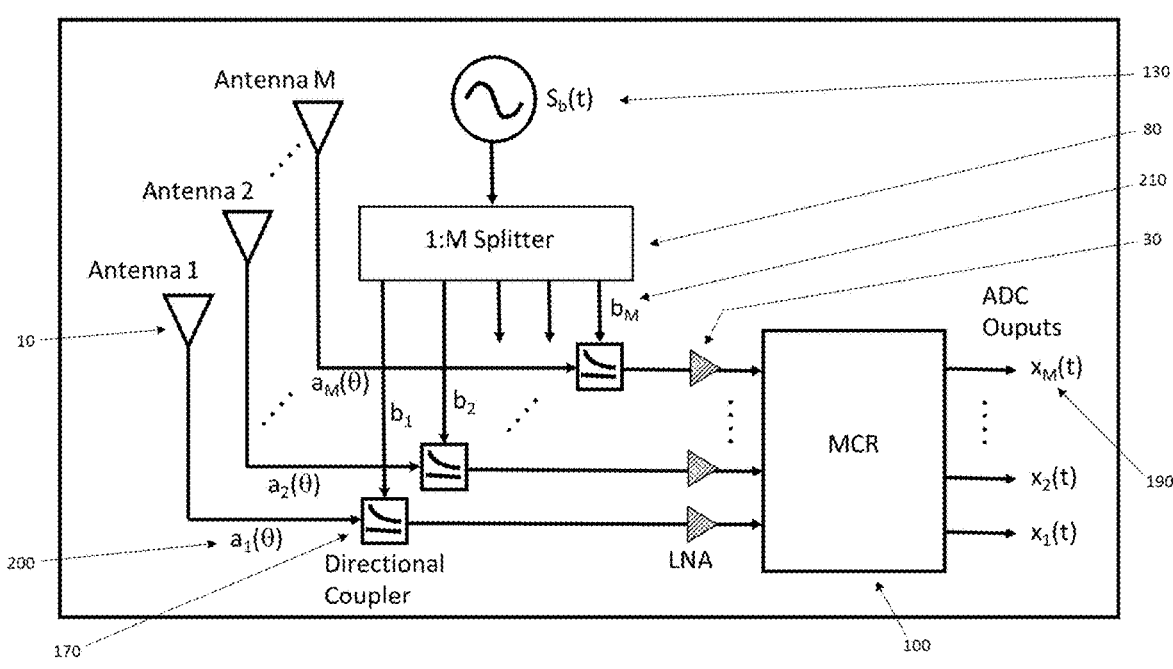

For either switched or coupled architecture, it should be pointed out that the Boresight (source) signal, $S_b(t)$, that is coupling into each $m^{th}$ channel takes the exact same path, through all filter and mixing products, due to its spectral vicinity to the desired Far Field Signal. This signal can be initially modeled, as $b_m S_b(t)$, where $b_m$ is simply the circuit length or circuit time delay from the boresight source to the coupler (m=1, 2, ..., M). In fact each $b_m$ path is simply the complex delay including the transmission line length from the source to the 1:M RF splitter, the splitter path delay (usually made from Wilkinsons binary splitters), the transmission line length from the splitter to the $m^{th}$ coupler, and finally any path length additive of the $m^{th}$ coupler, as shown in FIG. 7. The Far Field paths (200), which include both the path from an antenna to the Far Field source plus the antenna path length and the transmission line path length to the channel directional coupler (170) is denoted as $a_m(\theta)$, m=1, 2, ..., M. These values are a function of the Far Field Angle of Arrival, $\theta$.

The $b_m$ values (210) are path lengths from the common boresight source (130) to each channel directional coupler (170). They are independent of the Far Field Angle of Arrival.

For optimal implementation, it should also be mentioned that it is critical that the RF couplers precede any active component, such as the initial LNAs, as shown in FIG. 7. That is, even LNAs can add non-Gaussian or time variant artifacts into the signal path.

Thus the total signal input to each receiver port will now be:

$$a_m(\theta)s(t) + b_m s_b(t) + n_m(t)$$

And the vector response out from the ADC will be:

$$\underline{x}(t) = \text{diag}[\underline{\gamma}(t)] \cdot [\underline{a}(\theta)s(t) + \underline{b}s_b(t) + \underline{n}(t)] + \underline{\alpha}(t) =$$
$$\text{diag}[\underline{\gamma}(t)] \cdot \underline{a}(\theta\_s(t) + \text{diag}[\underline{\gamma}(t)] \cdot \underline{b}s_b(t) + \text{diag}[\underline{\gamma}(t)] \cdot \underline{n}(t) + \underline{\alpha}(t)$$

Figure 8:
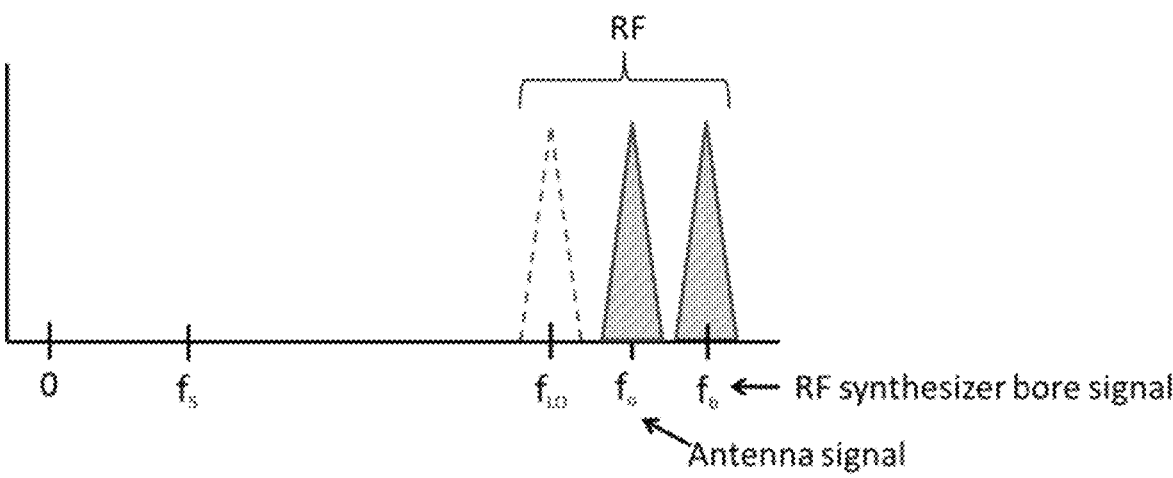
FIG. 8 shows a carrier frequency model for the far field (antenna) signal and Boresight Signal.

For each channel, at the carrier frequency spectral region, the signals will be spectrally located in the following fashion (narrowband model), shown in FIG. 8. The Far Field Signal, received from an antenna, is centered at frequency $f_o$, and the narrowband boresight tone is centered at frequency $f_b$. The Multi-Channel Receiver (MCR) Local Oscillator tone, used to downconvert both signals, is centered at frequency $f_{LO}$. Without loss of generality, this LO tone frequency could be positioned in other spectral locations.

Figure 9:
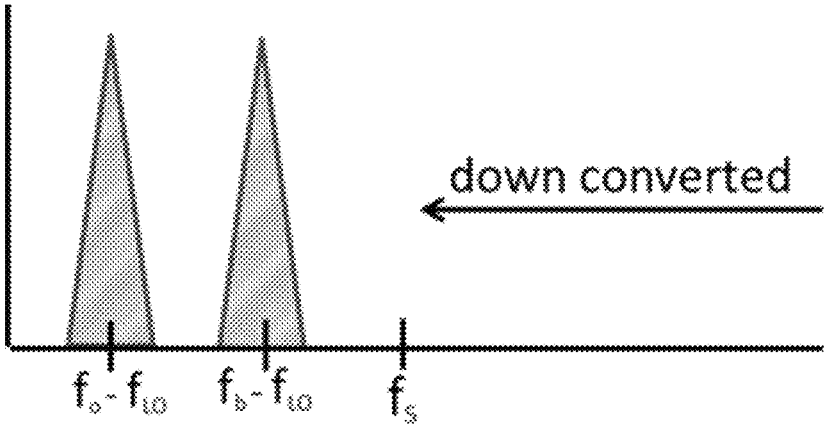
FIG. 9 shows a baseband representation of the two downconverted signals.

After coherent downconversion, the signals will be similarly arranged, in baseband, as seen in FIG. 9. Notice that the new signal frequencies will be all frequency shifted values from their original carrier frequencies, and thus with frequencies much less than their original carrier values.

After downconversion to baseband, prior to digital sampling, the two signal's spectral locations are shown in FIG. 9, where $f_s$ is the MCR ADC sample rate. For real valued signals, both downconverted signals will be positioned to a spectral location less than half of the sample rate. Note this process includes Low Pass Filtering to remove any image signals, prior to digitization. This representation will be similar for all M channels, again where M is the number of antennas as well as the number of independent receiver channels.

For the Narrowband case, it should be noted that both signals also have the very similar noise content. That is, as long as $f_s$ is much larger than twice the highest frequency of either signal, and for two signals that are spectrally closely spaced, the noise content on any single digital sample should be similar for each signal. We now band pass filter each separate signal, via a Digital DownConverter (DDC), and from the original combined signal output from the ADC:

$$\underline{x}(t) = \text{diag}[\underline{\gamma}(t)] \cdot \underline{a}(\theta)s(t) + \text{diag}[\underline{\gamma}(t)] \cdot \underline{b} \ s_b(t) + \text{diag}[\underline{\gamma}(t)] \cdot \underline{n}(t) + \underline{\alpha}(t)$$

That is, a copy of (20) is generated and fed to two different processing paths.

Figure 10:
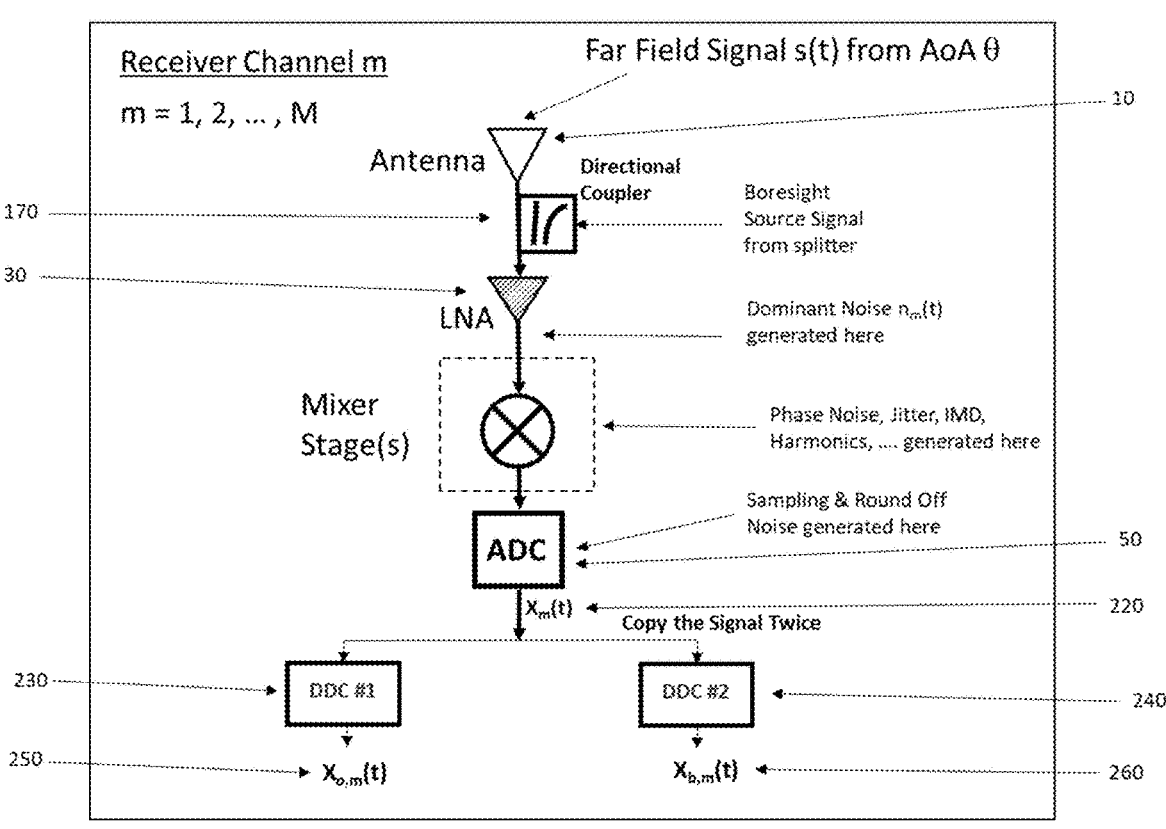
FIG. 10 shows the hardware implementation for the boresight process, for each m channel.

The hardware implementation for this approach (narrowband model shown), is seen in FIG. 10.

Instead of a single output (220) from each ADC, we now have two synchronous signals that are identical copies of each other and the signal at (220), yet each is processed with an independent path.

Note that RF circuitry, e.g. the RF Coupler (170), has been added prior to the LNA (30), or any active circuitry or long cables, and there are now two independent DDC channels, (230) and (240), after the ADC. Note, both DDCs, (230) and (240), can be implemented via FPGAs, or any other high speed processing mechanism, thus if the current (MRC) receiver FPGA has adequate computing power, then little or no Digital Hardware changes would be required at the back end. For Dual Polarization operation, one would implement three (3) DDC's per Channel. Two DDCs for each Far Field Signal polarization, and the third DDC for the boresight signal.

One path band pass filters the Far Field signal from the antenna, using DDC #1 (230), and the other path band pass filters the boresight signal, using DDC #2 (240). It is important that both filters have exactly the same number of taps (e.g. filter length), such that the two signals are still temporally synchronized. However, since each signal's spectral location will be slightly different, the filter [tap] coefficients will of course be different.

The first resultant signal (250) is the bandpass filtered Far Field Signal, with noise:

$$\underline{x}_o(t) = \text{diag}[\underline{\gamma}(t)] \cdot \underline{a}(\theta)s(t) + \text{diag}[\underline{\gamma}(t)] \cdot \underline{n}(t) + \underline{\alpha}(t)$$

And the second resultant signal (260) is the bandpass filtered Boresight Signal, with noise:

$$\underline{x}_b(t) = \text{diag}[\underline{\gamma}(t)] \cdot \underline{b} \ s_b(t) + \text{diag}[\underline{\gamma}(t)] \cdot \underline{n}(t) + \underline{\alpha}(t)$$

Note that we will have two such signals, (250) and (260), for each m channel (m=1, 2, ..., M).

What is very important here is that when the Far Field signal frequency and the boresight frequency are very close in spectral proximity, their time variant noise is almost completely identical. That is, on a sample by sample basis, their noise values are the same. Taking this to the limit (in time), thus not only are the noise values the same, but any non-linear or non-Gaussian [PDF] event that occurs on one signal, will also occur on the other. Therefore, the $\gamma(t)$ multiplicative value will be the same, or at least mostly similar, on the two signals.

If we now dot-divide each $m^{th}$ channel band pass filtered Far Field signal by the synchronous and band pass filtered $m^{th}$ channel boresight source signal, from the two processing paths, we get:

$$x_{ob,m} = \frac{\gamma_m(t) \cdot a_m(\theta)s(t) + \gamma_m(t)n_m(t) + \alpha_m(t)}{\gamma_m(t) \cdot b_m s_b(t) + \gamma_m(t)n_m(t) + \alpha_m(t)}$$

This is actually a very simple divide process in an FPGA. However, the results are fairly astonishing:

$$x_{ob,m} = \frac{\gamma_m(t) \cdot a_m(\theta)s(t) + \gamma_m(t)n_m(t) + \alpha_m(t)}{\gamma_m(t) \cdot b_m s_b(t) + \gamma_m(t)n_m(t) + \alpha_m(t)} \cdot \frac{1/\{\gamma_m(t) \cdot b_m s_b(t)\}}{1/\{\gamma_m(t) \cdot b_m s_b(t)\}}$$

$$= \frac{\dfrac{\gamma_m(t) \cdot a_m(\theta)s(t)}{\gamma_m(t) \cdot b_m s_b(t)} + \dfrac{\gamma_m(t)n_m(t)}{\gamma_m(t) \cdot b_m s_b(t)} + \dfrac{a_m(t)}{\gamma_m(t) \cdot b_m s_b(t)}}{1 + \dfrac{\gamma_m(t)n_m(t)}{\gamma_m(t) \cdot b_m s_b(t)} + \dfrac{a_m(t)}{\gamma_m(t) \cdot b_m s_b(t)}}$$

Firstly, canceling $\gamma(t)$ in the numerators and denominators, results in the following simplified form:

$$= \frac{\dfrac{a_m(\theta)s(t)}{b_m s_b(t)} + \dfrac{n_m(t)}{b_m s_b(t)} + \dfrac{\alpha_m(t)}{\gamma_m(t) \cdot b_m s_b(t)}}{1 + \dfrac{n_m(t)}{b_m s_b(t)} + \dfrac{\alpha_m(t)}{\gamma_m(t) \cdot b_m s_b(t)}}$$

We can now use the binomial expansion, where we assume that:

$$1 \gg \left\| \frac{n_m(t)}{b_m s_b(t)} + \frac{\alpha_m(t)}{\gamma_m(t) \cdot b_m s_b(t)} \right\|$$

Then:

$$x_{ob,m} = \left[ \frac{a_m(\theta)s(t)}{b_m s_b(t)} + \frac{n_m(t)}{b_m s_b(t)} + \frac{\alpha_m(t)}{\gamma_m(t) \cdot b_m s_b(t)} \right] \cdot$$

$$\left[ 1 - \left( \frac{n_m(t)}{b_m s_b(t)} + \frac{\alpha_m(t)}{\gamma_m(t) \cdot b_m s_b(t)} \right) + \dots \right]$$

The rest of the expansion to the right is simply higher order terms, which are negligible.

The boresight source is fixed in power, and usually set to just below the maximum receiver dynamic range level, plus some margin. This is usually around-50 dBm or greater. Thus, it can be assumed that:

$$E[s_b*(t)s_b(t)] \gg E[n_m*(t)n_m(t)]$$

For all m=1, 2, . . . , M
And that $$E[s_b*(t)s_b(t)] \gg E[\alpha_m*(t)\alpha_m(t)]$$

That is, even for significant LNA gain, on the order of 15 to 25 decibels, the resulting thermal noise power (variance) at the output of the LNA is still way below −90 dBm for most conditions.

Additionally, we assume that since the initial LNA is the $1^{st}$ stage amplification (gain stage), then all resulting noise products will be below this value, independent of their statistical PDF, by at least the gain value of the LNA (again 15 to 25 dB). Therefore:

$$x_{ob,m} = \left[ \frac{a_m(\theta)s(t)}{b_m s_b(t)} + \frac{n_m(t)}{b_m s_b(t)} + \frac{\alpha_m(t)}{\gamma_m(t) \cdot b_m s_b(t)} \right] \cdot [1]$$

$$= a_m(\theta)b_m^* \cdot \frac{s(t)}{s_b(t)} + \frac{1}{b_m s_b(t)} \cdot \left[ n_m(t) + \frac{\alpha_m(t)}{\gamma_m(t)} \right]$$

Let s'(t) now represent the quotient signal:

$$s'(t) = \frac{s(t)}{s_b(t)}$$

The boresight source provides a deterministic signal, or more accurately a spectral line function. Multiplication of a Gaussian distributed process by a Gaussian distributed process results in a Gaussian distributed process, although with likely a change in its variance. Additionally, since each $b_m$ is a constant for each channel, multiplication of a Gaussian distributed process by a constant results in a Gaussian distributed process. We can also interpret this as simply a frequency shift of the original signal, s(t), by the frequency of the boresight signal, which results in a Linear Time-Invariant (LTI) process.

We can also re-write the noise term for each $m^{th}$ antenna channel as:

$$n_m'(t) = \frac{n_m(t)}{b_m s_b(t)}$$

And thus $n_m'\gamma(t)$ is still a Gaussian distributed process, still with zero mean, but likely with a changed variance. Or viewed another way, as simply a frequency shifted (LTI) noise process.

We can now re-write the quotient response, for any $m^{th}$ channel as:

$$n_m'(t) = \frac{n_m(t)}{b_m s_b(t)}$$

Note that all stored calibration vectors, as well as any operational x data vector will now fully include the stationary (time invariant) boresight path delay, as well as the Far Field Angle of Arrival dependence, as components of the total steering vector. This final representation now appears very similar to:

$$\underline{x}(t) = \underline{a}(\theta)s(t) + \underline{n}(t) + \text{residual}$$

Where $$\text{residual} = \frac{1}{b_m s_b(t)} \cdot \left[ \frac{\alpha_m(t)}{\gamma_m(t)} \right]$$

The greater point is that for the most part, we have been able to rid ourselves of the multiplicative $\gamma(t)$ in both the desired signal as well as the additive LNA Gaussian Noise, which actually is a completely unknown value in amplitude as well as in phase.

It is unknown just what is within this residual component, since it is a combination of so very many components, with unknown variance, mean, and PDF's. However, it is extremely likely that the magnitude of the residual is far less, in magnitude, than the (new) variance of the original LNA thermal noise content.

Up to this point, we have deterministically shown that the use of a continuous Calibration Boresight source, injected into the RF signal stream via the use of directional RF couplers, for each m$^{th}$ channel, results in the removal of non-linear undesired artifacts produced by non-linear devices downstream of the antennas. However, this has been limited to putting the RF couplers and the other components very near to the MCR.

The system shown in FIG. 7 does not issue any constraint on the length of the cables between the directional couplers (170) and the MCR (100). Use of LNAs between the coupler and the MCR simply compensate for any line losses or front end MCR line losses, such as the use of RF PreSelector Filters prior to the gain stage (downstream LNA) embedded in the MCR. This design though, in FIG. 7, assumes or infers that the RF cables from the antennas (10) to the RF Couplers (170) can be any length and that the correctional circuitry of (170), (130), (80), and (30) are all relatively close the MCR (100).

Figure 11:
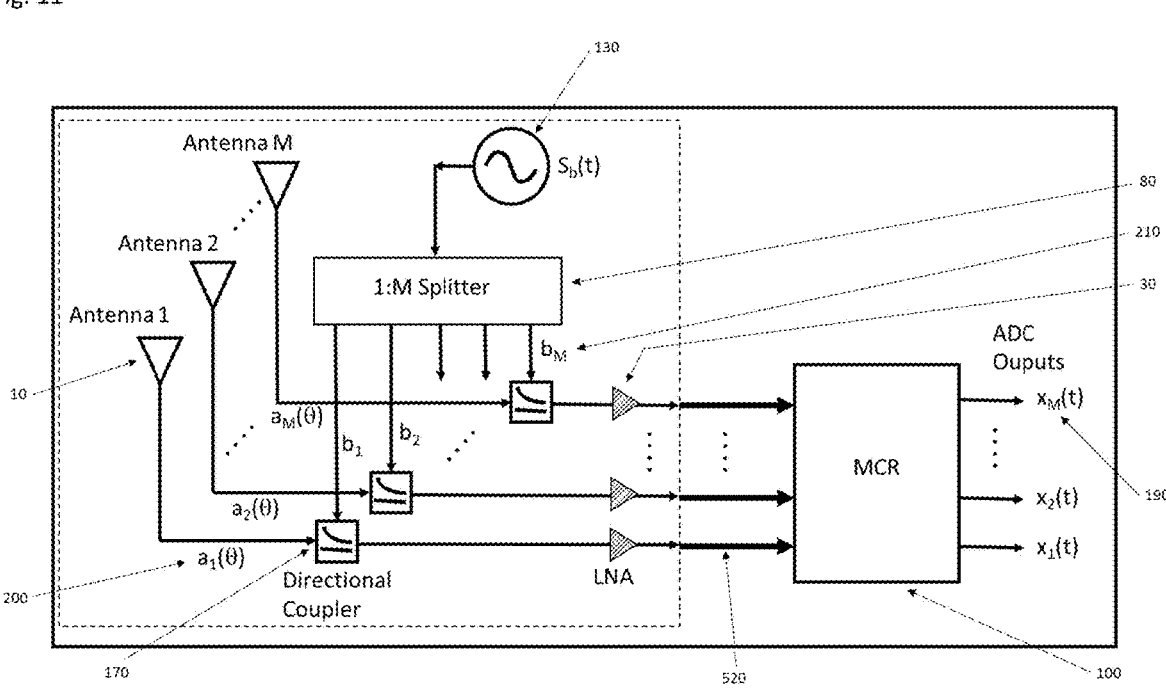
FIG. 11 shows the RF coaxial cable solution with longer cables and boresight source at the antenna array location.

However, if one were to use antennas that were very far placed from the MCR, on the order of 10 feet to 100 feet or more, one would likely want to put the LNAs as close to the couplers as possible and use the LNAs to compensate for the 100 feet of (transmission) line loss. This system is thus depicted in FIG. 11. Here, long RF cables (520) are assumed. Now, the LNAs (30) must utilize higher gain to compensate for the added transmission line, e.g. RF coaxial cable (520), losses. In this system version, the boresight calibration source (130) is contained close to the antennas.

Figure 12:
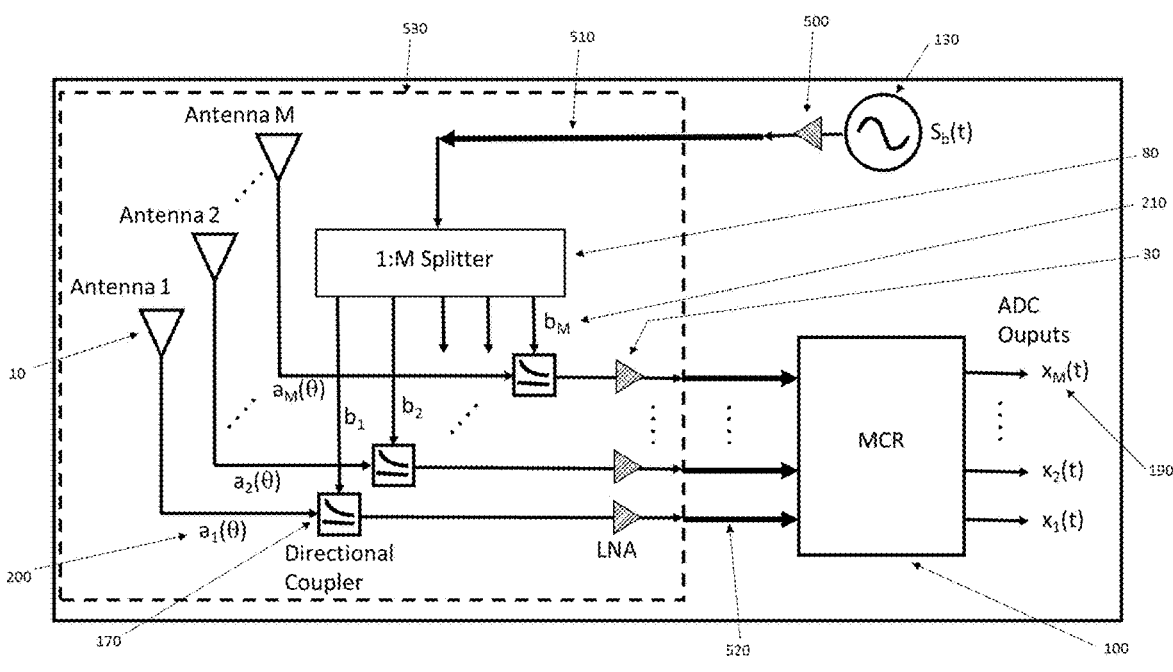
FIG. 12 shows the RF coaxial cable solution with longer cables and boresight source at the central receiver (MCR) location.

There are many cases where the antennas themselves are not only far from the MCR, but also far from each other. In this case, it might be preferred to have the boresight calibration source (130) closer to the MCR, as shown in in FIG. 12. Here, a longer transmission line (510) separates the Boresight Calibration source (130) from the 1: M RF splitter (80). This is yet another embodiment of the system in FIG. 11. Note that the RF transmissions lines from the LNAs to the MCR (520) are still coaxial, for this embodiment.

Figure 13:
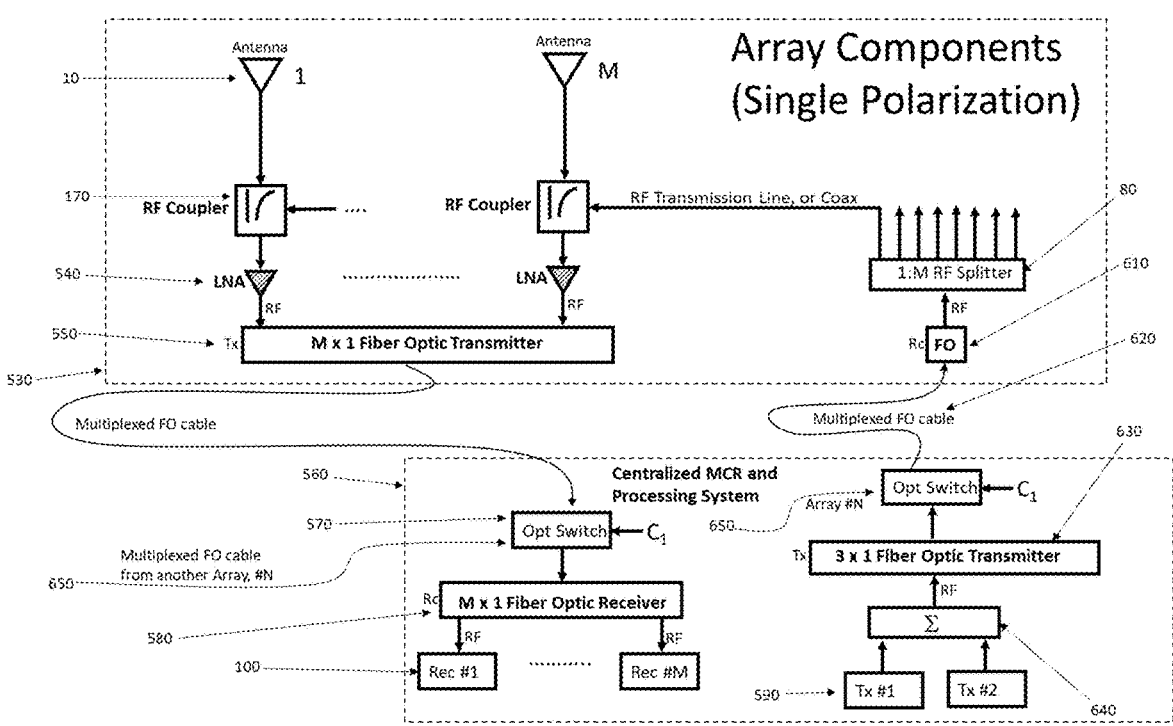
FIG. 13 shows the Fiber Optic connectivity solution, between the array and the centralized receiver system, for the case of a single signal polarization, multiplexed Fiber optic transmitter and receiver, and optical switch for communication to more than a single such array.

For many applications where longer RF cables are undesired, either due to size, weight, or losses, a fiber optic transport mechanism is a good alternative choice. The simplest method, which still allows the MCR system to be centralized, is to use "RF over Fiber" transport. In this case, the RF signals are simply modulated and demodulated onto a Fiber Optic carrier frequency, with Analog Fiber transport. One embodiment of this system is shown in FIG. 13. Array antennas (10) that are not close to the Centralized MCR and Processing system (560) have their RF signals converted to Fiber Optic (FO) Signals. For this embodiment, it is assumed that a single antenna polarization, at each antenna location is used. The antenna signals are fed directly to RF couples (170) and then through an LNA gain stage (540). This LNA gain is determined as the sum of losses through the Fiber Optic Transmitter (550) Fiber Optice Receiver (580), as well as any other loss mechanism prior the initial gain stage (LNA) within each receiver channel of the MCR (100). For this embodiment, a single multiplexed Fiber Optic Transmitter & Multiplexer (550) is used, which multiplexes the multiple (M) antenna RF signals onto a single or even multiple FO carriers within the subsystem. Note thought, without loss of generality, that multiple (M) FO transmitters can also be used, one for each antenna channel, with multiple FO stands used; one for each antenna channel.

The array system (530) is shown displaced in distance from the Centralized MCR and Processing system (560), with FO cable connecting the two major subsystems. Again, this can be multiple strands of FO cable, or a single cable.

At the Centralized system (560), the FO signals may go through an optical FO Switch (570), which can selected different arrays (530) for use of the Centralized resources (560). Thus, one or more similar RF arrays (650) could then be switched into the resources (560) for use, reducing system cost and SWAP. For only a single M-channel array, such an optical switch (570) would not be used. The FO signal, comprising all M channels, is now passed through a M×1 Fiber Optic Receiver which demodulates the FO carrier and delivers each distinct (M) RF signal channel and signal to a distinct RF coherent receiver (100) within the MCR for RF down conversion, multi-channel digitization, and subsequent application processing.

On the right side of FIG. 13 is the Boresight Calibration hardware and FO delivery, upstream to the array (530). Shown are two RF transmitters (590), however, this can be any number (N) of desired transmitters or RF sources. Each transmitter (590) provides a distinct Calibration signal to the array (530), which is summed (640) or multiplexed on a single or multiple FO lines. This embodiment only shows the case for a signal FO strand, with all N transmitters multiplexed on a common FO strand or line. A separate system provides a control signal channel into a 3×1 Fiber Optic Transmitter (630). Note, for N transmitters, this would be a N+1 multiplexed FO Transmitter (630). Again, use of an Optical Switch is optional. Transport is again either with a multiplexed FO cable (620), shown, or with multiple strands and transmitters & receivers, not shown. The output RF signal, from the FO receiver (610), is then fed into the 1:M RF splitter (80) with each line fed to a distinct RF coupler (170). Note this is drawn only for a single RF line. The completes the RF boresight and Calibration process. Therefore, FIG. 13 show the Fiber Optic connectivity solution, between the array and the centralized receiver system, for the case of a single signal polarization, multiplexed Fiber optic transmitter and receiver, and optical switch for communication to more than a single such array. It should be obvious to one skilled in the art that there are many numerous permutations of this design, that would be optimized and varied for different arrays and applications.

Figure 14:
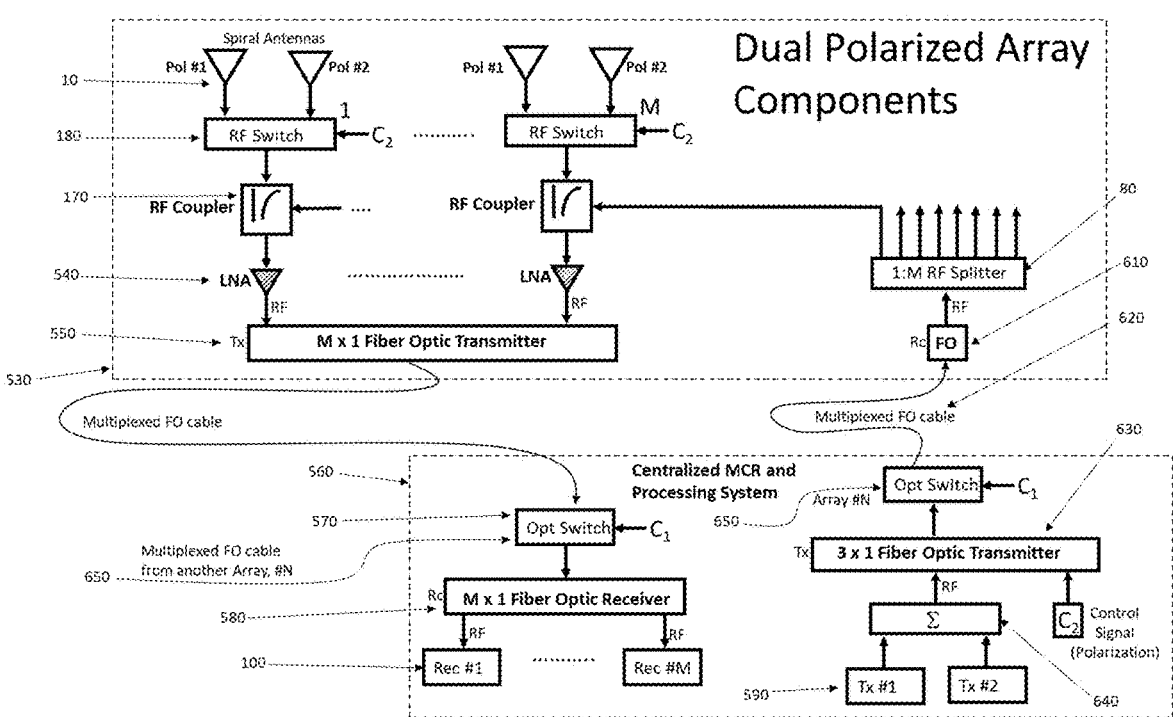
FIG. 14 shows the Fiber Optic connectivity solution, between the array and the centralized receiver system, for the case of dual signal polarization, multiplexed Fiber optic transmitter and receiver, and optical switch for communication to more than a single such array.

Another embodiment of the system, shown in FIG. 14, enables dual signal polarization, for each antenna channel. Thus, two spatially orthogonal antennas, per antenna channel are used. A separate control channel, $C_2$, is shown which selects a specific antenna polarization using a SPDT RF Switch (180). This control channels sames the same signal polarization for all M channels. Note, it is assumed that the RF switches (180) act as purely passive devices once the RF switching operation is completed. Therefore there are still no active RF components forward of the RF Couplers (170).

Figure 15:
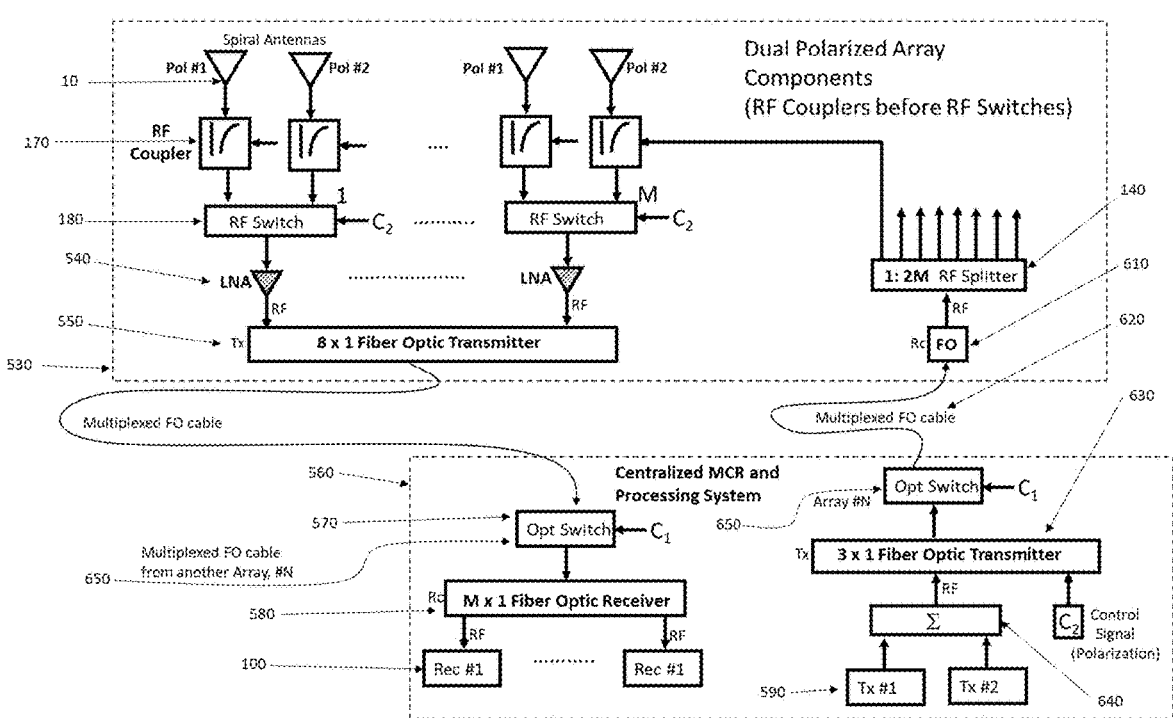
FIG. 15 shows the Fiber Optic connectivity solution, between the array and the centralized receiver system, for the case of dual signal polarization, multiplexed Fiber optic transmitter and receiver, and optical switch for communication to more than a single such array, however, in this case the RF couplers are forward of the 2:1 RF Switch.

FIG. 15 shows yet another embodiment of the system. In case the RF switches do in fact act with some measure of active response, it might be possible for these components to add error, perturbation, or signal non-linearities downstream, uncorrected. Therefore, for this case, the RF couplers (170) are installed forward of the RF switches (180). This embodiment therefore doubles the number of required RF Couplers (170) to 2 times M, where M is the number of effective RF channels in this array. Additionally, the RF Splitter (140) for the Boresight Calibration Source signals has been changed from M outputs to 2 times M outputs.

The Systems of FIGS. 11 through 15 all denote the connectivity between an array of antennas and a centralized

17

Figure 16:
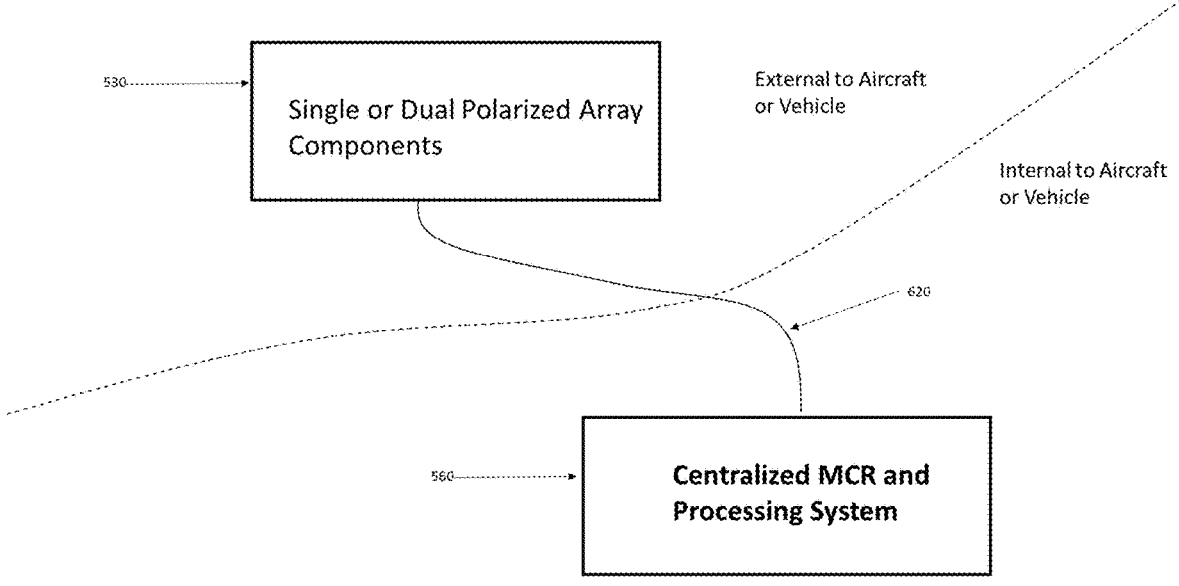
FIG. 16 shows the simplified diagram for the Fiber Optic Connectivity between the Array and the Centralized system, noting that the array is external to the platform and the Centralized Receiver system is internal to the platform.

18 system. For many of the applications, the antenna array will be external to a given platform with the centralized receiver and processing system internal to the platform. This is generically shown in FIG. 16.

What is claimed is:

1. A method of array signal calibration comprising:

a multiplicity of antenna array systems, each comprising of a multiplicity (M) of antennas, wherein for each antenna array system, a radio frequency (RF) coupler following each array antenna which sums a far field signal captured by each antenna with a RF calibration signal injected into each RF coupler to generate a downstream RF summation antenna signal, which denotes a single RF antenna path, followed by a downstream RF to fiber optic transmitter which multiplexes each RF summation antenna signal onto a single or multiplicity of fiber optic cables, to a centralized multi channel receiver system which is displaced from each antenna array system by more than 10 feet in physical distance, wherein the antennas and the RF couplers are installed external to an airborne, a shipboard, or a ground based platform and the centralized multi channel receiver system is installed internal to the same platform, wherein at the centralized multi channel receiver system an optical switch connects to the multiplicity of antenna array systems, and feeds a switched in optical signal to a fiber optic receiver, which demultiplexes the M signals and feeds a unique RF signal into each channel of the centralized multi channel receiver system, wherein the RF summation antenna signal follows a channel path with a multiplicity of active components in this path between the RF coupler and a downstream multi channel receiver system channel module, wherein a separate calibration source system comprising a multiplicity of RF transmitters, each generates the RF calibration signal which is RF summed in a RF combiner, and generates an upstream RF summed calibration signal, followed by an upstream RF to fiber optic transmitter which converts the upstream RF summed calibration signal into an optical calibration signal, which is fed through an upstream optical switch and followed by one or more fiber optic cables, to the antenna array location where the upstream optical signal is reconverted to an RF calibration signal, split copied through an RF splitter, wherein each RF calibration signal is then fed into the RF couplers, wherein a downstream low noise amplifier can be inserted between each RF coupler and the downstream RF to fiber optic transmitter, and;

wherein an upstream low noise amplifier can be inserted between the RF combiner, summing the RF summed calibration signal and the upstream RF to fiber optic transmitter.

2. The method of array signal calibration of claim 1 which does not utilize any optical switches and the centralized multi channel receiver system connects to a single antenna array system.

3. The method of array signal calibration of claim 1 where the RF couplers are prior to all active components in each channel path.

4. The method of array signal calibration of claim 1 where the RF summation antenna signal, used to correct for phase and amplitude errors or signal perturbations, is continuously injected into the RF couplers.

5. The method of array signal calibration of claim 1 where the injected RF summation antenna signal is used to achieve narrowband boresighting, pulse signal boresighting, or extremely wideband RF signal boresighting which corrects the signal distortion present in downstream active circuit components, and enables extremely high precision phase and amplitude measurements for RF sensing applications, to include angle of arrival (AoA) estimation or radar sensing.

6. The method of array signal calibration of claim 1 wherein there is a single RF Coupler for each antenna denoting a single polarization system, where for this embodiment the antenna far field signals are fed directly to the RF couplers and then through a low noise amplifier (LNA) gain stage, where the LNA gain is determined as the sum of losses through the RF to fiber optic transmitter, the fiber optic cables, and the fiber optic receiver, as well as any other loss mechanism within each receiver channel of the multi channel receiver system.

7. The method of array signal calibration of claim 1 where there are two RF couplers for each antenna, denoting a dual polarization system, where an RF switch is inserted after the two RF couplers, for each antenna path.

8. The method of array signal calibration of claim 1 where for this embodiment, a multiplicity of RF to fiber optic transmitters are used, which multiplexes the multiple (M) antenna RF signals onto multiple fiber optic cables.

9. The method of array signal calibration of claim 1 where at the centralized multichannel receiver system, the fiber optic signals go through a fiber optic switch, which can select different arrays for connectivity to the centralized multichannel receiver system.

\* \* \* \* \*